United States Patent Office 3,331,789
Patented July 18, 1967

3,331,789
COMPOUNDED RUBBERS
Richard A. Clark, Muskegon, Mich., assignor, by mesne assignments, to Texas Power and Light Company, Dallas, Tex., a corporation of Texas
No Drawing. Filed June 7, 1963, Ser. No. 286,215
6 Claims. (Cl. 260—28.5)

This invention relates to the compounding of rubber with additives extracted from low temperature tars obtained from the carbonization of coal and coal-like materials. I have discovered that certain extracts of such low temperature tars, when used separately or, preferably, together as rubber compounding agents, produce rubber compositions of very satisfactory properties for many uses. The usefulness of my invention resides in the production of new rubber compositions having properties heretofore only obtained by the use of more expensive compounding agents and, further, in providing new rubber compounding agents from plentiful low cost materials. The general objects of the invention are as above stated.

The term "rubber" is used herein to define, as a class, natural rubber, the copolymers of butadiene and styrene, the copolymers of butadiene and nitrile, such as acrylonitrile, and the polychloroprene rubbers. The synthetic copolymers just described are often described as styrene-butadiene rubbers and as nitrile-type rubbers or, collectively, as modified butadiene polymers. Those rubbers based on the polymerization of chloroprene have been variously designated in the art, but are usually called neoprene rubbers. In any event this invention is directed to the compounding of the class of rubbers above defined.

The compounding agents of this invention are two in number, both being the extracts of solubles from coal derived low temperature tars. One such agent is those solubles of said tars extracted by the use of straight chain alcohols of formula $CxH_{2}x+1OH$ where $x=1$ to 4, preferably methanol. The other such agent is those solubles of said tars extracted by the use of liquid aliphatic hydrocarbons of 4 to 8 carbon atoms, preferably hexane. Each of these, the alcohol extracted solubles and the aliphatic hydrocarbon extracted solubles, are useful separately as compounding agents for the rubbers of the class described. When used simultaneously as compounding agents, each such agent supplements the other and together they may produce in said rubbers characteristics not obtainable by either when used alone.

The low temperature tars from which the compounding agents of this invention are extracted are those tars obtained from the carbonization of coal or coal-like material at temperatures less than about 1150° F. Such low temperature carbonization processes are well known and are usually applied to such low grade coal materials as the high volatile bituminous, sub-bituminous and lignitic coals. The compounding agents of this invention are obtainable, as above indicated, by extraction of the tars with the indicated solvents. Counter-current simultaneous extraction is both satisfactory and economical, but other extraction techniques are employable. The material extracted from the low temperature tar is usually separated from the extractant by distillation of the extractant. The result, when the defined alcohol is used as the extractant, is a material solid at ordinary temperatures. When the defined aliphatic hydrocarbon is used as the extractant, the subsequent removal of the hydrocarbon by distillation leaves a solid or pitch-like material accompanied by an oil phase which may, if desired, be separated as by distillation, from the solid material or be left with the solid material, without affecting its use for the purposes herein described. Since the extractants, thus recovered, may be reused, and since the low temperature tar from which the extractions are made is a low cost material, the materials which are the result of the alcohol extraction, and of the aliphatic hydrocarbon extraction, are of relatively low cost as compared to such rubber compounding agents as the anti-oxidants phenyl-beta-naphthylamine and di-tert-butyl-paracresol usually used in rubber compounding and the rubber plasticizers such as butyl oleate and di-(2-ethylhexyl) sebacate and, possibly, of no greater cost than petroleum-type plasticizers, all commonly used in various rubbers for well known purposes. I prefer to treat the alcohol soluble material with heat to strip it of materials distillable up to about 210 to 235° C. In the case of the aliphatic hydrocarbon solubles, I prefer to strip the solubles of material distillable up to 300° C.

The alcohol and aliphatic hydrocarbon extracts of the low temperature tars have been found to be, considering their cost, excellent rubber compounding agents and materials which can be used by the rubber compounder, in accordance with the skills of his art, as a substitute for materials heretofore used as plasticizers, extenders, softeners and anti-oxidants in the compounding of rubber as herein defined. This is not to say that in these rubbers these extracts will produce better effects than materials previously commonly used for such purposes, although in specific instances such betterment, as hereinafter specifically indicated, has been observed. Laying aside any possible betterment, the low costs of these extracted materials, reflecting their low cost origin, is such as to offer economic benefits which may at times even outweigh a lesser performance than that of known additives. Overall the extracted materials of this invention are compatible with the rubber, are workable therewith, raising no unusual difficulties in the field of mechanical compounding, and are comparable in respect of effect on scorch and cure times (Mooney scale, American Society of Testing Materials, procedure D1077–55T) with some of the previous commonly used additives. These extractants are good plasticizers and in respect of the neoprene and nitrile type rubbers, the aliphatic hydrocarbon extract of these tars appear to offer more than usual possibilities, either as a replacement or a part replacement to much more costly plasticizers such as butyl oleate.

To the present observations have indicated that these extractants from the low temperature tars are especially useful where a relative permanence, or resistance to deterioration, of physical properties is desired in a compound of the indicated rubbers after vulcanization. For this particular purpose common additives heretofore used, and often termed anti-oxidants, include phenyl-beta-naphthylamine, di-tert-butyl-paracresol and petroleum-type plasticizers. To illustrate the utility of the extractants of this invention, comparisons hereinafter presented are as to rubber compounded with these extractants as compared to rubber compounded with phenyl-beta-naphthylamine, di-tert-butyl-paracresol or petroleum-type plasticizer. The particular petroleum-type plasticizer used was a saturated polymerized petroleum hydrocarbon which was a black liquid, reported in the literature—Compounding Ingredients for Rubber, 3rd edition "Rubber World"—as having Saybolt Furol viscosity of 250–350 seconds at 140° F., a specific gravity of 0.95 to 1.02 and a flash point of 400° F., minute. This liquid is sold by its manufacturer under the trade name Para-Flux.

In properties important to such anti-oxidant compounds, the herein described extractions from tars compare favorably with these known and used anti-oxidants. In respect of staining characteristics, percent permanent set, resistance to dynamic flexing, tear resistance, impact resistance, scorch and cure time, rubber compounded with the low temperature tar extractants as defined by this invention are comparable to rubber compounded with the common anti-oxidant additives above mentioned.

Indeed, rubbers compounded with the materials extracted material was also present, and the aliphatic hydrocarbon extract, those containing the alcohol extracted material were superior.

The comparative effects on scorch and curing times of the use, as compounding additives, of the low temperature tar extractants as compared to the use of the known anti-oxidants above mentioned is illustrated in the following Table I. For illustrative purposes, a butadiene styrene copolymer known commonly as SBR 1500 was selected as the test rubber. The designation Δ followed by a number as used in Table I indicates points of rise above minimum viscosity, and the data in the columns thereunder are the minutes required to obtain such rise. The data of Table I is merely indicative of the fact that, in general, as previously stated, the rubbers compounded in accordance with this invention are equivalent as to scorch and curing times with rubbers compounded with additives of a type commonly used in rubber compounding.

TABLE I

| Additive | Amount per Hundred Part of Rubber in Composition | Mooney Scorch and Cure Times, Minutes at 302° F. | | | |
|---|---|---|---|---|---|
| | | Δ5 | Δ20 | Δ35 | Δ35−Δ5 |
| None | | 11 | 14 | 15.5 | 4.5 |
| Phenyl-beta-naphthylamine | 2 | 12.5 | 16 | 17 | 4.5 |
| Di-tert-butyl-paracresol | 2 | 16 | 21.5 | 26 | 10 |
| Petroleum-type plasticizer | 2 | 14 | 16 | 17.5 | 3.5 |
| Do | 5 | 15 | 18 | 20 | 5 |
| Do | 10 | 17 | 20 | 21 | 4 |
| Methanol extract | 2 | 13 | 16 | 18 | 5 |
| Do | 5 | 11 | 15 | 16.5 | 5.5 |
| Do | 2 | 12 | 16.5 | 18 | 6 |
| Hexane extract | 5 | 17.5 | 19 | 22 | 4.5 |
| Do | 10 | 13 | 16.5 | 18 | 5 |
| Methanol extract+Hexane extract Ratio 3:1 | 5 | 11 | 14 | 16 | 5 |
| Methanol extract+Hexane extract Ratio 1:1 | 5 | 12.5 | 16.5 | 19 | 6.5 |
| Methanol extract+Hexane extract Ratio 1:3 | 5 | 13 | 17 | 20 | 7 | tracted from the low temperature tars tend to withstand dynamic flexing in a manner generally superior to rubbers compounded with these known anti-oxidants which have essentially the same modulus of elasticity. Thus, for instance, a batch of styrene butadiene copolymer to which had been added ordinary amounts of zinc oxide, carbon black, stearic acid, sulphur and benzothiazyl disulphide was divided into six portions which were further compounded, respectively, with phenyl-beta-naphthylamine, di-tert-butyl-paracresol, said petroleum-type plasticizer, alcohol extracted material from said low temperature tars, aliphatic hydrocarbon extracted material and mixtures of said alcohol extracted material and said aliphatic hydrocarbon extracted material. These batches were vulcanized, molded and subjected to dynamic flexing by a Demattia Flexometer. The observation as to the growth of cracks in the compounded rubber samples, all of which had a modulus in the range of 150 to 200 pounds per square inch at 100 percent elongation, showed that in every instance the samples containing the alcohol extracted material and the aliphatic hydrocarbon extracted material were superior to the samples containing phenyl-beta-naphthylamine or dibutyl paracresol, and, in all instances except one, the samples containing the aliphatic hydrocarbon extraction of the low temperature tars, the samples containing the materials extracted from the tars were superior to the samples containing the polymerized petroleum fraction. As between the samples containing the alcohol extracted material, whether or not the aliphatic hydrocarbon I have discovered that when rubbers are compounded with the extracts of low temperature tars above described, and the purpose is that of securing anti-oxidant properties with an overall balance of other desirable properties in the compounded rubber, the best results are achieved when a mixture or blend of the alcohol extracted material and the aliphatic hydrocarbon extracted material is used and when this blend is in the ratio range of 3 to 1 to 1 to 3 unit for unit the alcohol extracted materials from the low temperature tars appear to be more effective as anti-oxidants than do the aliphatic hydrocarbon extracted materials. However, from the viewpoint of overall balance of all desirable properties in the compounded rubber, the use of a combination of the two extracted materials in the above indicated ratios give better results.

The properties of the compounded rubbers of this invention are generally indicated, as to anti-oxidant properties by the results set forth in Table II where the compounded rubber base, apart from the additive specifically named in Table II consisted of 400 parts by weight of a butadiene styrene copolymer, 40 parts by weight of carbon black, 5 parts by weight of zinc oxide, 2 parts by weight of sulphur, 3 parts by weight of benzothiazyl disulphide and 1.5 parts by weight of stearic acid. In each case shown in Table II the rubber compound was cured for 60 minutes at 302° F. Its indicated properties were then measured in the unaged condition and after aging, respectively, for four days and seven days at 212° F.

TABLE II

| Anti-oxidant added | Amount of anti-oxidant added, parts per hundred of rubber | Modulus at 100% Elongation in pounds per square inch | | | Tensile Strength in pounds per square inch | | | Percent elongation | | | Shore Hardness on A-2 Durometer | | |
|---|---|---|---|---|---|---|---|---|---|---|---|---|---|
| | | Un-aged | Aged 4 days | Aged 7 days | Un-aged | Aged 4 days | Aged 7 days | Un-aged | Aged 4 days | Aged 7 days | Un-aged | Aged 4 days | Aged 7 days |
| None | | 190 | 780 | 1,230 | 3,570 | 1,830 | 1,380 | 550 | 160 | 110 | 63 | 76 | 77 |
| Phenyl-beta-napthylamine | 2 | 170 | 840 | 1,170 | 3,340 | 1,880 | 1,440 | 550 | 120 | 120 | 61 | 74 | 78 |
| Di-tert-butyl-paracresol | 2 | 190 | 800 | (¹) | 2,940 | 1,330 | 1,120 | 720 | 140 | 90 | 59 | 76 | 78 |
| Petroleum-type plasticizer | 2 | 170 | 680 | 1,020 | 2,720 | 1,420 | 1,490 | 510 | 170 | 130 | 62 | 75 | 78 |
| Do | 5 | 100 | 540 | 980 | 2,940 | 1,420 | 1,180 | 630 | 170 | 110 | 60 | 74 | 79 |
| Do | 10 | 100 | 450 | 840 | 3,430 | 1,240 | 1,320 | 700 | 180 | 130 | 57 | 70 | 76 |
| Methanol extract | 2 | 180 | 520 | 950 | 3,590 | 1,740 | 1,580 | 650 | 210 | 140 | 64 | 76 | 78 |
| Do | 5 | 180 | 430 | 680 | 3,710 | 2,390 | 2,270 | 670 | 340 | 260 | 67 | 76 | 80 |
| Do | 10 | 200 | 400 | 550 | 3,370 | 2,440 | 1,850 | 630 | 410 | 260 | 74 | 79 | 83 |
| Hexane extract | 2 | 100 | 620 | 1,120 | 4,100 | 1,440 | 1,740 | 630 | 160 | 130 | 66 | 75 | 79 |
| Do | 5 | 160 | 530 | 890 | 3,900 | 1,310 | 1,390 | 670 | 170 | 140 | 65 | 75 | 79 |
| Do | 10 | 140 | 410 | 620 | 3,400 | 1,690 | 1,680 | 700 | 270 | 210 | 65 | 75 | 79 |
| Methanol extract plus hexane extract ratio 3:1 | 2 | 160 | 460 | 730 | 3,680 | 1,660 | 1,540 | 670 | 230 | 160 | 65 | 75 | 80 |
| Do | 5 | 150 | 440 | 680 | 3,630 | 2,350 | 1,840 | 690 | 320 | 210 | 66 | 75 | 79 |
| Do | 10 | 180 | 410 | 560 | 3,700 | 2,670 | 2,990 | 700 | 420 | 400 | 72 | 79 | 83 |
| Methanol extract plus hexane extract ratio 1:1 | 2 | 130 | 450 | 830 | 3,200 | 1,930 | 1,380 | 740 | 240 | 120 | 67 | 74 | 80 |
| Do | 5 | 110 | 320 | 590 | 3,380 | 2,280 | 2,010 | 740 | 340 | 220 | 65 | 74 | 79 |
| Do | 10 | 80 | 370 | 510 | 3,200 | 2,710 | 2,490 | 710 | 440 | 350 | 67 | 76 | 81 |
| Methanol extract plus hexane extract ratio 1:3 | 2 | 90 | 410 | 820 | 3,170 | 2,310 | 1,550 | 760 | 310 | 150 | 62 | 72 | 79 |
| Do | 5 | 90 | 390 | 610 | 2,960 | 1,960 | 1,450 | 740 | 300 | 180 | 65 | 73 | 78 |
| Do | 10 | 120 | 330 | 470 | 3,130 | 1,530 | 1,950 | 750 | 380 | 310 | 66 | 75 | 78 |

¹ Not measured.

The exact formulations which may be used in the practice of this invention by those skilled in the art of rubber compounding forms no part of this invention and will be governed by the specifications of use to which a rubber is compounded. The amount of either the alcohol extracted materials or the aliphatic hydrocarbon extracted materials which may be used in a given compounded rubber of the class above described is not significant so long as it is in effective amounts for the desired purposes and like other rubber compounding agents these amounts vary to the dictates of the compounder and his purposes. Generally, as previously indicated, these materials extracted from the low temperature tars are, for equivalent results, used in larger quantities in the rubber composition than is usual when the previously known and commonly used anti-oxidants have been used. However, since these alcohol and aliphatic hydrocarbon extracted materials may be used together with other previously known and commonly used anti-oxidants to either supplement or partially replace such anti-oxidants or may be used to replace all or a part of such common plasticizers as petroleum-type fractions or such materials as the ester-type plasticizers commonly used in neoprene and nitrile-type rubber formulations, or all or a part of processing aids or extenders, the exact amounts to be used will be governed by the result derived from the rubber formulation and by the economic gain inherent in the substitution of these lower cost materials extracted from low temperature tars. Obviously an excess of either of these low temperature tars extracts over the amount actually needed is wasteful. Where anti-oxidant properties plus a balancing of other properties such as hardness, staining, scorch time and the like is the end sought, I prefer to use 2 to 5 parts per hundred parts of rubber of the alcohol extracted material, or of that material together with the aliphatic hydrocarbon extracted material, the total in the ratios above indicated. Where anti-oxidant properties are the primary end sought, my preference is about 10 parts per hundred parts of rubber. Considering all the useful aspects of the alcohol extracted material and of the aliphatic hydrocarbon extracted material as useful rubber compounding agents, including such purposes as processing aids and extenders, I have to date observed no condition which would require an amount of more than 25 parts of either per hundred parts of rubber in the sense that the use of more would bring a further result which would justify the additional cost.

Having thus described my invention, I claim:

1. A compounded rubber composition consisting essentially of major rubber constituent selected from the class consisting of natural rubber, the copolymers of butadiene and styrene, the copolymers of butadiene and nitrile and the polychloroprene rubbers, and a material derived from tars resulting from the carbonization of coal at temperatures below about 1150° F. by extracting said tars with an alcohol of formula $C_xH_{2x+1}OH$ in which $x$ equals 1 to 4, said material being present in amount effective to modify the properties of the said rubber constituent, the said properties including those of anti-oxidation, softening, response to rubber working processes, resistance to deterioration, withstanding of dynamic flexing, resistance to impact, resistance to tear and response to curing.

2. The composition of claim 1 in which the extracting alcohol is methanol.

3. A compounded rubber composition consisting essentially of major rubber constituent selected from the class consisting of natural rubber, the copolymers of butadiene and styrene, the copolymers of butadiene and nitrile and the polychloroprene rubbers, and a material derived from tars resulting from the carbonization of coal at temperatures below about 1150° F. by extracting said tars with a liquid aliphatic hydrocarbon containing not less than 4 or more than 8 carbon atoms, said material being present in amount effective to modify the properties of the said rubber constituent, the said properties including those of anti-oxidation, softening, response to rubber working processes, resistance to deterioration, withstanding of dynamic flexing, resistance to impact, resistance to tear and response to curing.

4. The composition of claim 3 in which the extracting hydrocarbon is hexane.

5. A compounded rubber composition consisting essentially of major rubber constituent selected from the class consisting of natural rubber, the copolymers of butadiene and styrene, the copolymers of butadiene and nitrile and the polychloroprene rubbers, and material derived from tar resulting from the carbonization of coal at temperatures below about 1150° F., a portion of said material being derived by extracting said tar with an alcohol of formula $C_xH_{2x+1}OH$ in which $x$ equals 1 to 4 and another portion of said material being derived by extracting the tar with a liquid aliphatic hydrocarbon containing not less than 4 or greater than 8 carbon atoms, the ratio of the said portions to each other being in the range of 3 to 1 to 1 to 3, the said material being present in total amount effective to modify the properties of the said rubber constituent, the said properties including those of anti-oxidation, softening, response to rubber working processes, resistance to deterioration, withstanding of dynamic flexing, resistance to impact, resistance to tear and response to curing.

6. The composition of claim 5 in which the extracting alcohol is methanol and the extracting hydrocarbon is hexane.

References Cited

UNITED STATES PATENTS 2,331,979  10/1943  Henderson _____ 260—28.5
2,955,079  10/1960  Foley _____ 208—45
3,153,626  10/1964  Kulik _____ 208—45

OTHER REFERENCES

Marchionna, "Butalastic Polymers: A Treatise on Synthetic Rubbers," Reinhold Publishing Corporation, New York, 1946, pp. 416, 420, 421, and 435.

Whitby, "Synthetic Rubber," John Wiley and Sons, Inc., New York, 1954, pp. 383, 384, 416 and 813.

MORRIS LIEBMAN, *Primary Examiner.*

B. A. AMERNICK, *Assistant Examiner.*

UNITED STATES PATENT OFFICE

CERTIFICATE OF CORRECTION

Patent No. 3,331,789                             July 18, 1967

Richard A. Clark

It is hereby certified that error appears in the above numbered patent requiring correction and that the said Letters Patent should read as corrected below.

In the heading to the printed specification, line 5, after "Texas" insert -- and Aluminum Company of America, Pittsburgh, Pa., a corporation of Pennsylvania --.

Signed and sealed this 12th day of November 1968.

(SEAL)
Attest:

Edward M. Fletcher, Jr.                         EDWARD J. BRENNER

Attesting Officer                                 Commissioner of Patents